(12) United States Patent
Kim et al.

(10) Patent No.: US 8,441,567 B2
(45) Date of Patent: May 14, 2013

(54) DIGITAL PHOTOGRAPHING APPARATUS AND METHOD OF CONTROLLING THE SAME

(75) Inventors: Hye-jin Kim, Seoul (KR); Jun-ho Choi, Seoul (KR); Sung-ho Eun, Seoul (KR); Na-ri Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 12/838,552

(22) Filed: Jul. 19, 2010

(65) Prior Publication Data

US 2011/0063491 A1 Mar. 17, 2011

(30) Foreign Application Priority Data

Sep. 14, 2009 (KR) .................. 10-2009-0086665

(51) Int. Cl.
*H04N 5/222* (2006.01)
*H04N 5/225* (2006.01)
*G06F 3/041* (2006.01)

(52) U.S. Cl.
USPC ............... 348/333.01; 348/207.99; 345/173

(58) Field of Classification Search ............. 348/333.01, 348/333.02, 333.05, 333.07, 333.11, 333.12, 348/207.99; 345/73, 173
See application file for complete search history.

(56) References Cited

U.S. PATENT DOCUMENTS

| | | | | |
|---|---|---|---|---|
| 6,169,568 B1 * | 1/2001 | Shigetomi | ............... | 725/76 |
| 7,110,040 B1 * | 9/2006 | Misawa | ............... | 348/373 |
| 7,649,562 B2 * | 1/2010 | Misawa et al. | ............ | 348/333.01 |
| 2005/0110768 A1 * | 5/2005 | Marriott et al. | ............. | 345/173 |
| 2010/0265209 A1 * | 10/2010 | Nurmi et al. | ............. | 345/174 |

* cited by examiner

*Primary Examiner* — Trung Diep
(74) *Attorney, Agent, or Firm* — Drinker Biddle & Reath LLP

(57) ABSTRACT

A digital photographing apparatus and a method of controlling the digital photographing apparatus prevent a touch malfunction from occurring while holding the digital photographing apparatus by having a touch protection area in the digital photographing apparatus. The digital photographing apparatus includes a large-sized touch screen on one surface thereof, wherein the touch screen includes: a touch area which inputs a touch from a user and executes icons corresponding to the touch; and a touch protection area which is not activated by the touch when the touch from the user is input on the touch screen.

15 Claims, 9 Drawing Sheets

FIG. 14
(a)
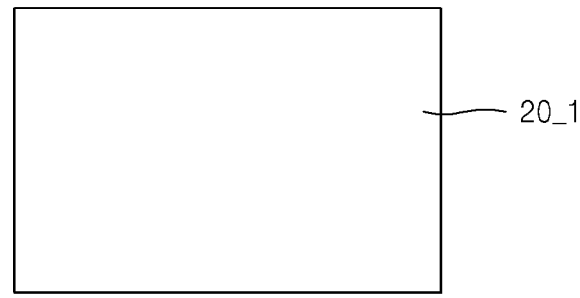
(b)
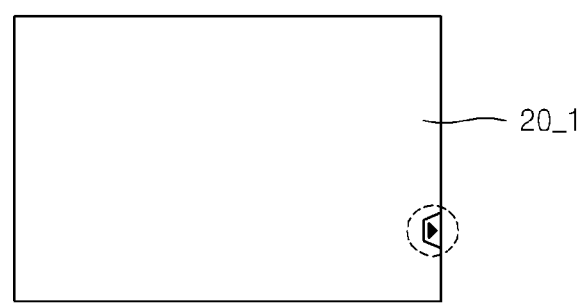
(c)
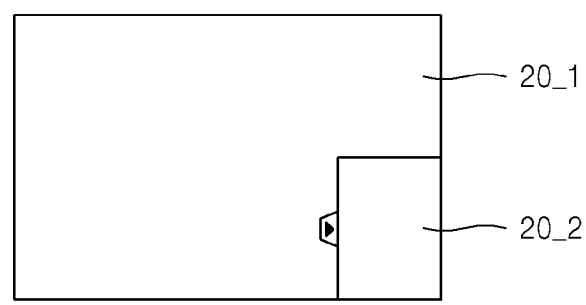

DIGITAL PHOTOGRAPHING APPARATUS AND METHOD OF CONTROLLING THE SAME

CROSS-REFERENCE TO RELATED PATENT APPLICATION

This application claims the priority benefit of Korean Patent Application No. 10-2009-0086665, filed on Sep. 14, 2009, in the Korean Intellectual Property Office, the disclosure of which is incorporated herein in its entirety by reference.

BACKGROUND

1. Field of the Invention

Embodiments relate to a digital photographing apparatus including a touch screen and a method of controlling the digital photographing apparatus, and more particularly, to a digital photographing apparatus including a touch screen and a method of controlling the digital photographing apparatus, wherein a touch malfunction is prevented from occurring while holding the digital photographing apparatus by having a touch protection area in the digital photographing apparatus.

2. Description of the Related Art

In digital photographing apparatuses such as digital still cameras (DSC), digital single-lens reflex (DSLR) cameras, and digital video cameras, a display unit such as a liquid crystal monitor is installed in the rear surface thereof and a preview image of a subject before being photographed or a captured image may be displayed on the display unit.

Currently, digital photographing apparatus sizes are rapidly becoming smaller and a size of the display unit is becoming larger for displaying a more vivid image. Also, the display unit has gradually changed to a touch screen for providing user convenience and simplifying use of an operation unit.

However, when a large-sized touch screen is installed in the digital photographing apparatus and thus a ratio of an area occupied by the display unit increases in a main body of the digital photographing apparatus, a part (a grip part) for holding the digital photographing apparatus while photographing, is reduced, and thus, it is difficult to hold the digital photographing apparatus.

In addition, the hand used to hold the digital photographing apparatus may cover the touch screen, and thus, icons in the touch screen may be pressed and a malfunction may occur.

SUMMARY

Embodiments of a digital photographing apparatus including a touch screen and a method of controlling the digital photographing apparatus may prevent a touch malfunction from occurring while holding the digital photographing apparatus by having a touch protection area in the digital photographing apparatus.

According to an embodiment, a digital photographing apparatus comprises a display unit in the form of a touch screen, including: a touch area which receives a touch from a user and executes icons corresponding to the touch; and a touch protection area which is not activated by the touch when the touch by the user is sensed, wherein the touch protection area selected by a user is activated on the touch screen in a photographing mode and the activated touch protection area is indicated on the touch screen for the user to recognize the activated touch protection area.

The touch protection area may be arbitrarily set on the touch screen and a plurality of points may be input in the touch area so as to form the touch protection area comprising the points as vertexes.

A size or a location of the touch protection area may be arbitrarily changed on the touch screen.

When the size or the location of the touch protection area is changed, a size or a location of the icons may be adjusted so that the icons in an original touch area and the changed touch protection area do not overlap each other.

A plurality of touch protection areas may be included on the touch screen.

According to another embodiment, a method of controlling a digital photographing apparatus includes: setting a touch protection area which is not activated by a touch when the touch is input on a touch screen; activating the set touch protection area selected by a user on the touch screen; inputting a touch on the touch screen, wherein the touch is performed by the user; detecting coordinate information for the input touch; determining whether the input touch is in the touch protection area by using the coordinate information; and blocking when the input touch is determined to correspond to the touch protection area.

The touch protection area may be set by inputting a plurality of points on the touch screen and forming an area comprising the points as vertexes.

In the setting of the touch protection area, a size or a location of the touch protection area may be arbitrarily changed on the touch screen.

When the size or the location of the touch protection area is changed, a size or a location of icons may be adjusted so that the icons in an original touch area and the changed touch protection area do not overlap each other.

In the setting of the touch protection area, a plurality of touch protection areas may be included on the touch screen.

According to another embodiment, a digital photographing apparatus includes: a touch protection area setting unit which sets a touch protection area on a touch screen which is not activated by a touch by a user when the touch is sensed; a touch protection area activation unit which activates the set touch protection area selected by the user on the touch screen; a touch input unit which inputs a touch on the touch screen by the user; a coordinate detection unit which detects coordinate information for the input touch; a touch protection area determining unit which determines whether the input touch is in the touch protection area by using the coordinate information; and a touch protection execution unit which blocks the input touch when the input touch corresponds to the touch protection area.

The touch protection area setting unit may set the touch protection area by inputting a plurality of points on the touch screen and forming an area comprising the points as vertexes.

The touch protection area setting unit may arbitrarily change a size or a location of the touch protection area on the touch screen.

When the size or the location of the touch protection area is changed, a size or a location of icons may be adjusted so that the icons in an original touch area and the changed touch protection area do not overlap each other.

The touch protection area setting unit may set a plurality of touch protection areas on the touch screen.

BRIEF DESCRIPTION OF THE DRAWINGS

The above and other features and advantages will become more apparent by describing in detail exemplary embodiments with reference to the attached drawings in which:

FIG. 14 is a view for explaining an example of the method of controlling the digital camera shown in FIG. 13.

DETAILED DESCRIPTION

As described herein, a digital camera is discussed as one or more embodiments of a digital photographing apparatus. However, the invention is not limited thereto and a digital device such as a camera phone including a touch screen and a digital photographing function, a personal digital assistant (PDA), or a portable multimedia player (PMP) may be also used.

Figure 1:
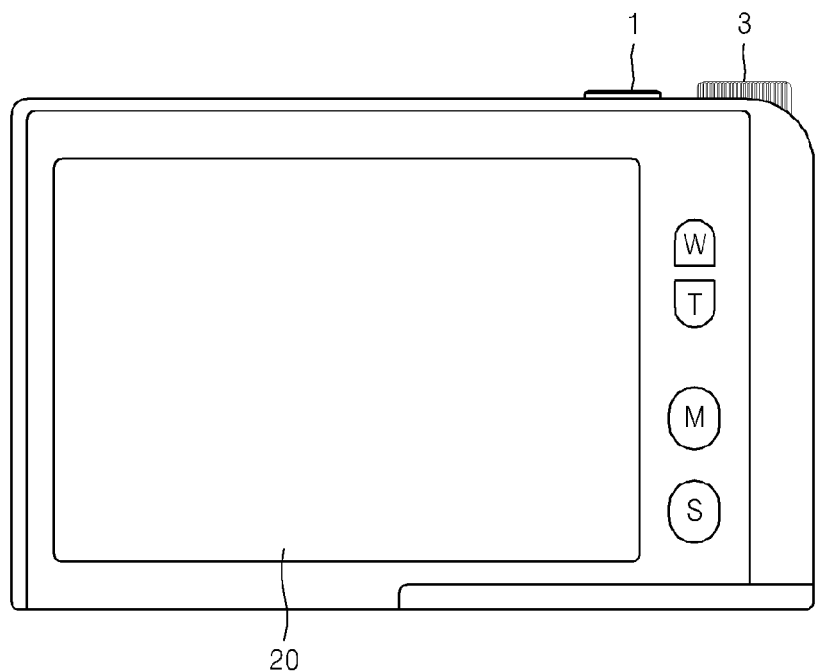
FIG. 1 is a rear view of a digital camera according to an embodiment.

FIG. 1 is a rear view of the digital camera. The digital camera includes a power button 1, a shutter release button 3, a touch screen 20, and other various buttons.

The power button 1 may be input to supply power to the digital camera so as to operate the digital camera.

The shutter release button 3 may be pressed and unpressed so as to expose a charge coupled device 4 (CCD: image sensor) to light for a set time when capturing a still image and may be linked with an iris (not illustrated) so as to appropriately expose a subject, thereby recording an image in the CCD 4.

A wide angle-zoom button w or a telephoto-zoom button t may be manipulated to respectively widen or narrow a viewing angle and in particular, to change a size of a selected exposure area.

When the wide angle-zoom button w is manipulated, a subject is zoomed out from and is viewed as if at a long distance. That is, a viewing angle is widened so that it is advantageous for photographing a subject at a wide angle and thus a size of the selected exposure area is reduced. When the telephoto-zoom button t is manipulated, a subject is zoomed in on and is viewed as if near by. That is, a viewing angle is narrowed so that it is advantageous for photographing a subject at a narrow angle and thus a size of the selected exposure area is increased.

Buttons M and S may be manipulated to change a mode from a photographing mode to a playback mode or to execute various menus including various touch protection area setting menus. Also, an arbitrary value (for example, color or brightness) may be selected from the menus, or lower menu icons included in main menu icons may be activated. However, the buttons M and S may not be included and operations executed by manipulating the buttons M and S may be performed by touching icons included in the touch screen 20.

The touch screen 20, which is one type of display unit, recognizes a touch input by a user and transmits the recognized touch input to a controller 200, thereby manipulating the digital camera. Unlike what is illustrated in FIG. 1, the touch screen 20 may be formed to occupy the entire rear surface of the digital camera. The structure and operation method of the touch screen 20 will be described in more detail with reference to FIG. 3.

Figure 2:
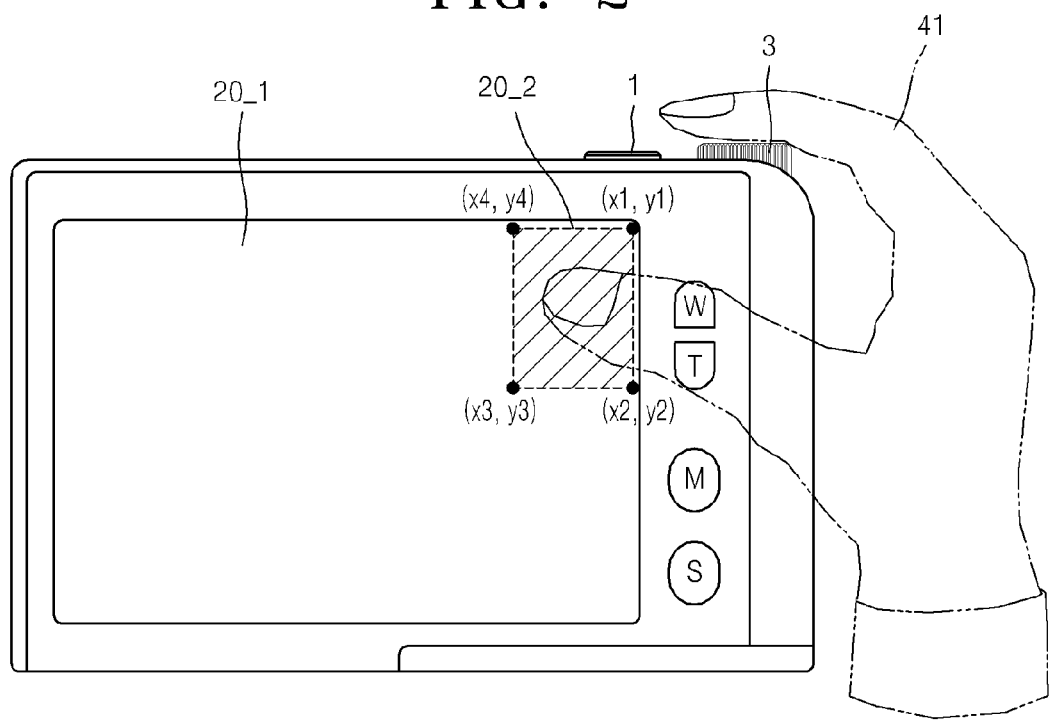
FIG. 2 is a view of a touch protection area for when the digital camera of FIG. 1 is gripped.

FIG. 2 is a view of a touch protection area for when the digital camera of FIG. 1 is gripped.

When a subject is photographed by using the digital camera, a grip part of the digital camera is gripped with the right hand 41 as illustrated in FIG. 2 and the front surface including a photographing lens of the digital camera faces the subject. In this case, due to a large-sized display unit, a part of the touch screen 20 may be touched by the photographer's hand 41. In FIG. 2, the upper right side of the touch screen 20 is touched by the photographer's thumb.

If an icon used to generate a control signal for executing an operation of the digital camera is placed on the part of the touch screen 20 where the photographer's hand 41 touches, a touch error may occur and an undesired operation may be executed. If a position of the hand 41 is changed so as to not touch the icon, the digital camera may be unstable.

Accordingly, the touch screen 20 according to an embodiment includes a touch area 20_1 and a touch protection area 20_2.

The touch area 20_1 included in a large-sized touch screen 20 formed on one side of the digital camera receives a touch by a user and generates a signal for controlling an operation of the digital camera. In general, icons are placed in the touch area 20_1.

The touch protection area 20_2 may be arbitrarily set by a user in the touch area 20_1 included in the touch screen 20. Although the touch protection area 20_2 receives and senses a touch by the user, the touch does not activate any icon or operation. For example, when the touch protection area 20_2 is set, icons included in the touch protection area 20_2 are not executed even if the touch by the user is sensed in the touch protection area 20_2. More specifically, when a touch is input to the touch protection area 20_2, a controller 200 reads coordinates that correspond to the touch, determines whether the coordinates are in the touch protection area 20_2, and then executes an operation that corresponds to the touch protection area 20_2. Such a process is performed in the controller 200; however, if the touch is sensed, any action corresponding to the touch does not occur in the display (e.g., touch screen 20) of the digital camera and thus, the touch does not activate any operation.

Referring to FIG. 2, a closed area having the vertexes of (x1, y1), (x2, y2), (x3, y3), and (x4, y4) is the touch protection area 20_2. However, location, shape, and size of the touch protection area 20_2 are not limited thereto. Accordingly, the touch protection area 20_2 having various shapes and sizes may be placed at any part gripped by the user as in the upper right side of the touch screen 20 illustrated in FIG. 2.

A setting and operating method of the touch protection area 20_2 will be described in more detail with reference to FIGS. 3 and 4.

Accordingly, since the touch protection area 20_2 is included in the touch screen 20, the photographer may stably grip the digital camera, and a touch malfunction, which may occur by the conventional grip, may be prevented.

Moreover, the touch protection area 20_2 may have various forms, which will be described in more detail with reference to FIGS. 5 through 11.

Figure 3:
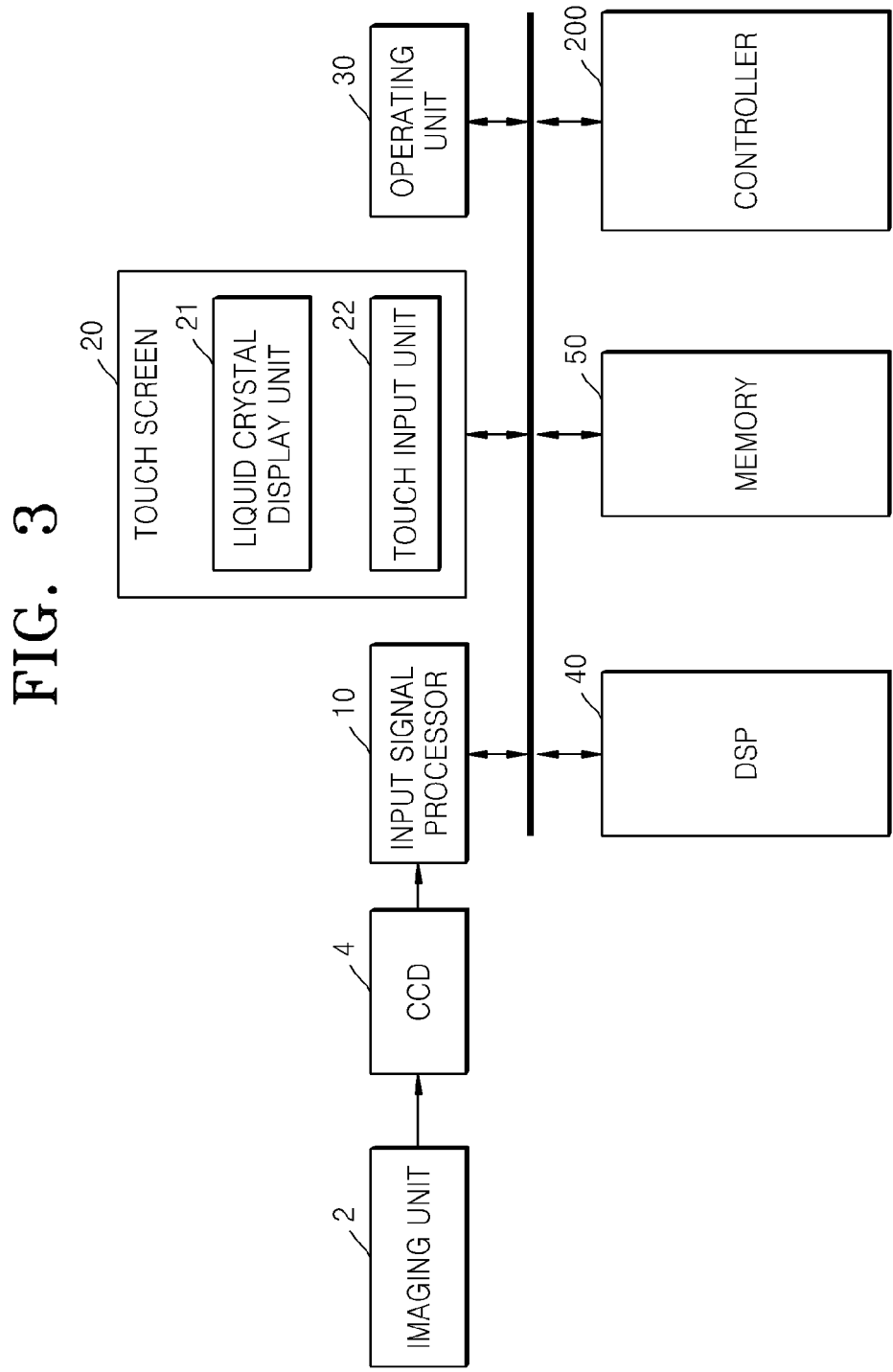
FIG. 3 is a block diagram of a digital camera, according to an embodiment.

FIG. 3 is a block diagram of a digital camera, according to an embodiment. The digital camera includes an imaging unit 2, a charge coupled device (CCD) 4, an input signal processor 10, the touch screen 20, an operating unit 30, a digital signal processor (DSP) 40, a memory 50, and a controller 200.

The imaging unit 2 may include a lens (not illustrated) for concentrating optical signals, an iris (not illustrated) for controlling an amount of light of the optical signals, and a shutter (not illustrated) for controlling inputs of the optical signals.

The lens may include a zoom lens, which controls a viewing angle to be narrowed or widened according to a focal length, and a focus lens, which focuses on a subject. These lenses may be separately formed or may be formed as a group of a plurality of lenses. A mechanical shutter in which a cover thereof moves up and down may be used as the shutter. Moreover, instead of using a separate shutter, the CCD 4 may function as a shutter by controlling a supply of an electric signal. The imaging unit 2 may include a motor which drives the lens, iris, and shutter, wherein the motor may drive the lens according to a desired location thereof, open and close the iris, and operate the shutter in order to execute auto focus, automatic exposure control, iris control, and focus change. The motor may receive a control signal from the DSP 40 to control operations of the lens, iris, and shutter.

The CCD 4 receives an optical signal input from the imaging unit 2 and an image of a subject is formed. Image sensors may include a complementary metal oxide semiconductor (CMOS) sensor array, in addition to the CCD 4.

The input signal processor 10 may further include an analog/digital (A/D) converter for digitizing an analog signal, which is an electric signal supplied from the CCD 4. Also, a circuit for signal processing which adjusts gain or standardizes a waveform with respect to the electric signal provided from the CCD 4 may be included.

The touch screen 20 is one type of display unit and a user may input numbers, characters, and various data by using a touching method. The touch screen 20 includes a liquid crystal display unit 21 and a touch input unit 22.

The liquid crystal display unit 21 may realize an image corresponding to image data provided from the input signal processor 10 in real-time or may display an image corresponding to image data restored from an image file stored in the memory 50. In addition, the liquid crystal display unit 21 may indicate various icons used to execute operations according to touch signals input from the touch input unit 22.

The touch input unit 22 is formed of various layers including a specially treated electrode glass (indium tin oxide (ITO) glass) and electrode film (ITO film) so as to sense a signal input by a user. When a screen is touched by a finger or a pen, a location touched on the touch screen 20 is sensed by a display location recognition sensor (not illustrated).

The touch screen 20 including the touch input unit 22 and the liquid crystal display unit 21 may include a device which controls the transparency. That is, when a user desires to input data through the touch screen 20, a required screen may appear on the liquid crystal display unit 21. When a user does not use the touch screen 20, there may be no data displayed on the liquid crystal display unit 21 and thus the touch screen 20 remains transparent.

The operating unit 30 may include a member for operating the digital camera or performing setting for photographing. For example, the member may be realized as buttons W, T, M, and S, keys, or dials. User control signals for power on/off, photographing beginning/stop, reproducing beginning/stop/searching, driving of an optical system, mode change, menu operation, and selection operation may be input through the buttons W, T, M, and S, keys, or dials.

The DSP 40 may reduce noise with respect to input image data and may perform image signal processing for quality improvement such as gamma correction, color filter array interpolation, color matrix, color correction, and color enhancement. Also, image data generated by processing image signals for quality improvement may be compressed to generate image files or image data may be restored from the image files. An image compression method may include reversible compression or irreversible compression. For example, an image may be converted into the form of Joint Photographic Experts Group (JPEG) or JPEG 2000. Also, in the DSP 40, sharpness processing, color processing, blur processing, edge emphasizing, image interpreting, image recognition processing, and image effect processing may be performed. Due to the image recognition processing, face recognition or scene recognition may be performed. In addition, display image signal processing may be performed in the DSP 40 so as to display an image on the liquid crystal display unit 21. For example, brightness level adjustment, color calibration, contrast adjustment, edge enhancement, scene division, character image generation, and image synthesis may be performed. The DSP 40 may be connected to an external monitor and thus may perform predetermined image signal processing so as to display an image on the external monitor. The DSP 40 may transmit the processed image data and control displaying of the corresponding image on the external monitor.

The memory 50 may include a part that temporarily stores data for input images, data for performing a processing operation, and processing results, a part that stores algorithms needed for operating a digital camera and setting data, and a part that stores image files.

The controller 200 may control each element according to an input through the touch screen 20 or may control each element according to a control signal that a user may input through the operating unit 30. Algorithms for performing various inputs and control signals and set data may be stored in the memory 50.

An operation of the controller 200 is described in more detail with reference to FIG. 4.

Figure 4:
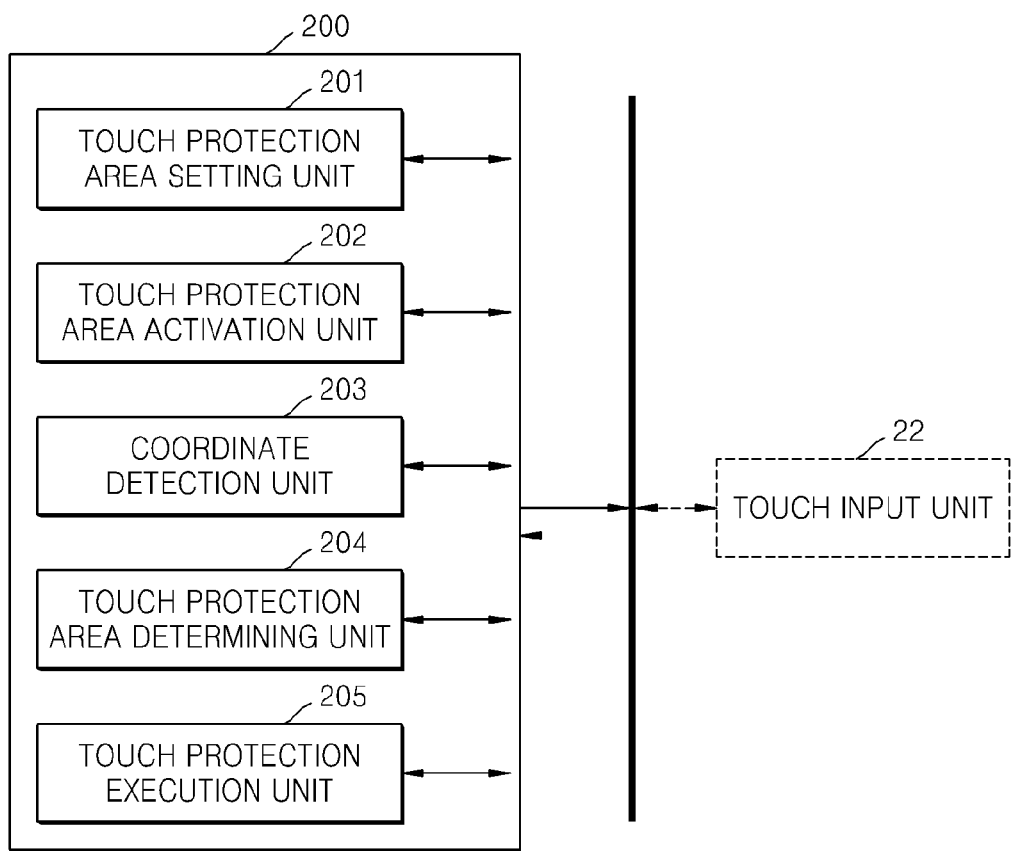
FIG. 4 is a block diagram of a controller included in the digital camera of FIG. 3.

FIG. 4 is a block diagram of the controller 200 included in the digital camera of FIG. 3.

Referring to FIGS. 3 and 4, the controller 200 according to the current embodiment may include a touch protection area setting unit 201, a touch protection area activation unit 202, a coordinate detection unit 203, a touch protection area determining unit 204, and a touch protection execution unit 205.

The touch protection area setting unit 201 is included in the touch screen 20 and is for setting the touch protection area 20_2 of FIG. 2 which is not activated by a touch even if the touch is received from a user. In the touch protection area 20_2 of FIG. 2, although the touch by a user is sensed, an icon corresponding to a location of the touch is not executed. Due to an operation of the controller 200, which will be described below, although the touch is sensed in view of the display (e.g., touch screen 20), an operation corresponding to the touch does not occur and the touch is not activated. An operation of the touch protection area 20_2 will be described in more detail with reference to the description of the coordinate detection unit 203, the touch protection area determining unit 204, and the touch protection execution unit 205.

When a user inputs a plurality of points in the touch area 20_1 of FIG. 1 by touching, a closed area including the points as vertexes may be formed according to the algorithm previously stored in the memory 50. The inside of the closed area may be set as the touch protection area 20_2 of FIG. 2. For example, referring to FIG. 2, a user may input points (x1, y1), (x2, y2), (x3, y3), and (x4, y4) and thus the touch protection area setting unit 201 may form an area connecting each point. Then, the inside of the generated area may be set as the touch protection area 20_2 of FIG. 2.

A method of setting the touch protection area 20_2 is not limited thereto and a user may directly input the touch protection area by drawing the touch protection area 20_2, or a touch protection area 20_2 previously set in an inside program may be used.

The touch protection area activation unit 202 may activate the touch protection area 20_2 selected by a user on the touch screen 20. The touch protection area 20_2 of FIG. 2 set by the touch protection area setting unit 201 may be activated by the user so as to be displayed on the touch screen 20 or may be inactivated so as to not be displayed on the touch screen 20 but instead, be hidden. For example, when a user activates the touch protection area 20_2 by touching an icon used to activate the touch protection area 20_2, the touch protection area activation unit 202 may transmit a control signal to activate the touch protection area 202 on the touch screen 20 and the activated touch protection area 20_2 may be displayed as a box or may be shaded so the user may recognize the activated touch protection area 20_2. The operation of the touch protection area activation unit 202 is not limited thereto and the activated touch protection area 20_2 may be inactivated so as to not be displayed on a screen and instead, be hidden. Such an operation will be described in more detail with reference to FIG. 14.

The coordinate detection unit 203 detects coordinate information for the touch received by the touch input unit 22 of the touch screen 20. For example, the touch screen 20 may be divided into an arbitrary number of areas or may be formed of a coordinate plane including a horizontal axis (e.g., x-axis) and a vertical axis (e.g., y-axis). The coordinate detection unit 203 may detect the received touch as a two-dimensional plane coordinate value (x, y). However, a method of detecting coordinates is not limited thereto and coordinate information of the touch may be detected in a specific area (for example, A1 through A12) from among arbitrarily divided areas instead of one arbitrary point (x, y).

The touch protection area determining unit 204 determines whether the coordinate, to which the touch is input, corresponds to the touch protection area 20_2 of FIG. 2 by using the coordinate information detected by the coordinate detection unit 203. Here, the coordinate information and area information for the coordinate information may be matched to each other and stored in the memory 50 of FIG. 3. In this case, the touch protection area determining unit 204 may determine whether the coordinate information is in the touch area 20_1 or in the touch protection area 20_2 of FIG. 2 by searching the memory 50 of FIG. 3.

As a result of the determination by the touch protection area determining unit 204, when the coordinates of the touch correspond to the touch area 20_1 of FIG. 2, an operation corresponding to the touch may be performed as normal. For example, when the touch screen 20 is touched by a user in an image playback mode and a trash can icon exists in the coordinates of the area where the touch is sensed, the controller 200 may move the indicated image file to the trash can.

When the touch protection area determining unit 204 determines that the coordinates of the touch are in the touch protection area 20_2 of FIG. 2, the touch protection execution unit 205 blocks a signal corresponding to the touch. As an example, the touch protection execution unit 205 may read the coordinates where the touch is sensed to determine whether the coordinates are in the touch protection area 20_2 and block a signal for performing an operation corresponding to the coordinates from being generated in the touch protection execution unit 205. As another embodiment, even if the signal for performing an operation corresponding to the coordinates is generated, a process of ignoring the signal may be performed. However, embodiments are not limited thereto and a process of ignoring the touch itself sensed in the touch protection area 20_2 may be performed before detecting the coordinates.

When the touch occurs in the touch protection area 20_2 of FIG. 2, the touch protection execution unit 205 ignores the touch (e.g., by blocking) and thus icons in the touch protection area 20_2 of FIG. 2 may be inactivated. Thus, the touch protection area 20_2 of FIG. 2 may be gripped by a user.

Hereinafter, various setting methods of the touch protection area 20_2 of FIG. 2 and a method of controlling the touch protection area 20_2 of FIG. 2 are described in more detail.

FIGS. 5 through 11 are views illustrating a method of controlling the digital camera of FIG. 1.

Figure 5:
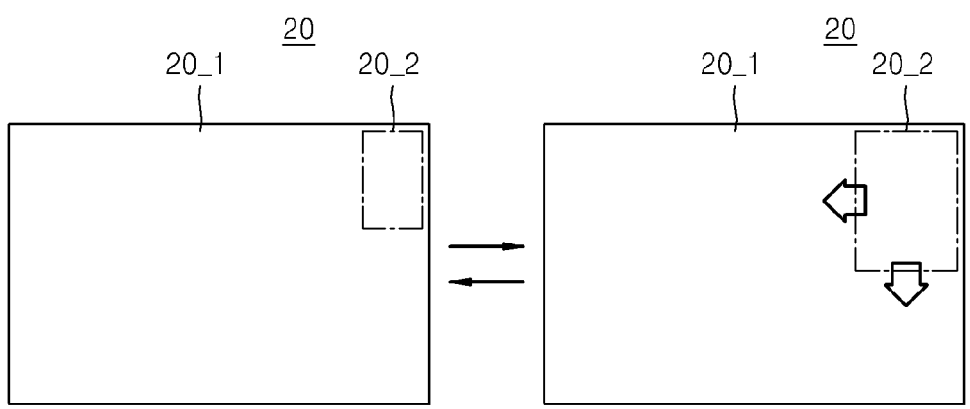
FIGS. 5 through 11 are views illustrating a method of controlling the digital camera of FIG. 1.

Referring to FIG. 5, a user may execute a function of a menu for setting a touch protection area so as to set the touch protection area 20_2. A size of the set touch protection area 20_2 may be arbitrarily changed by the user. For example, the user may drag a corner or a vertex of the touch protection area 20_2 to expand the size. However, such size setting may be performed after executing a function of the menu for setting the touch protection area 20_2; otherwise, the size setting may be recognized as a touch in the touch protection area 20_2 and thus the setting may not be accomplished.

Figure 6:
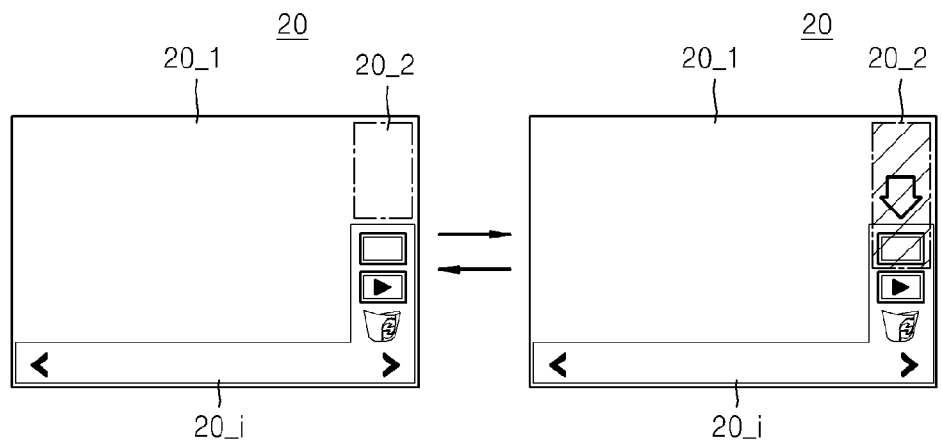

Referring to FIG. 6, although a size of the touch protection area 20_2 increases, an arrangement or size of an icon 20_i is not changed and instead, the touch protection area 20_2 may be formed as a layer covering the icon 20_i. In this case, the icon 20_i included in the touch protection area 20_2 may not be activated even if the touch is in the same location as the icon 20_i.

Figure 7:
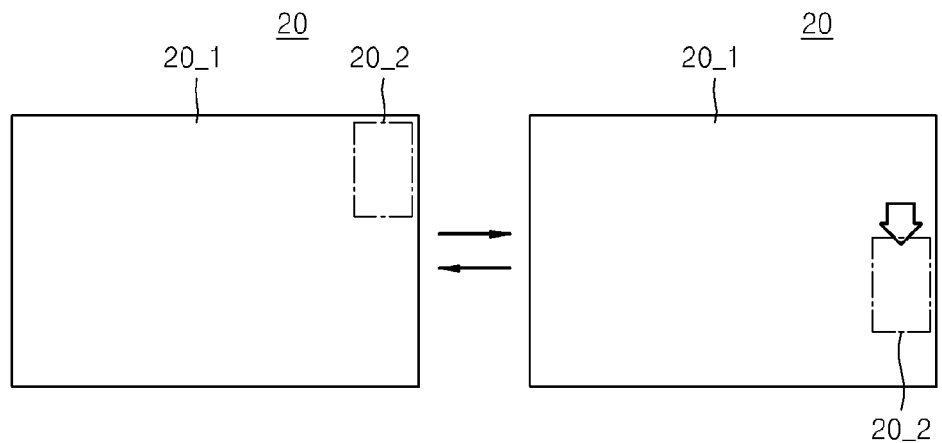

Referring to FIG. 7, a location of the set touch protection area 20_2 may be changed. For example, the user may execute a function of a menu for setting the touch protection area and then touch or drag the inside point of the touch protection area 20_2 so as to move the touch protection area 20_2 to a desired location.

Figure 8:
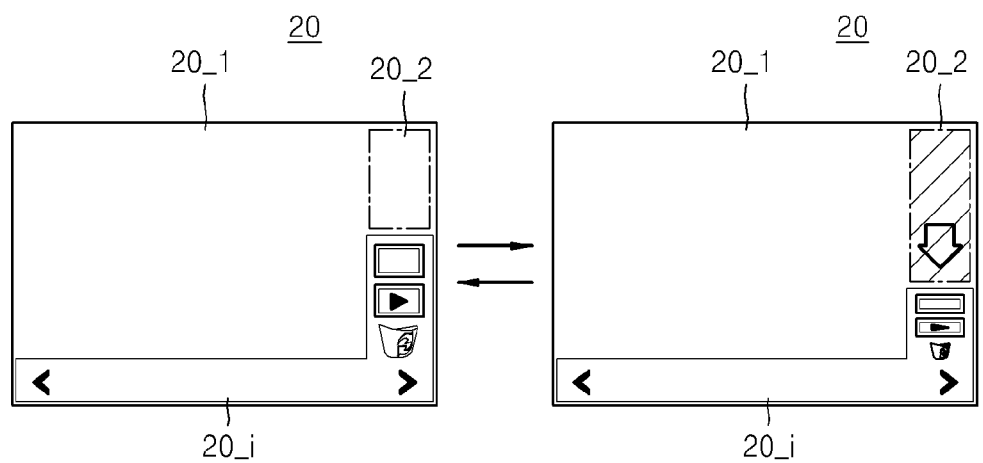
Figure 9:
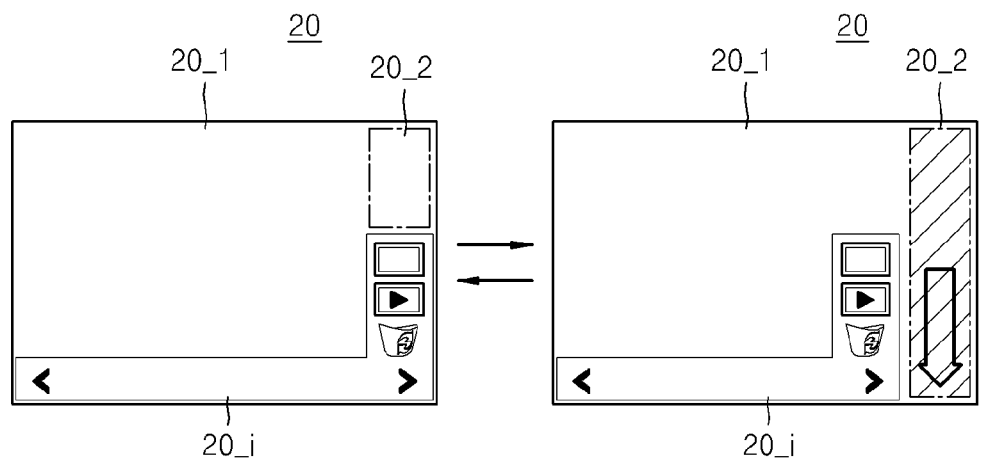
Figure 10:
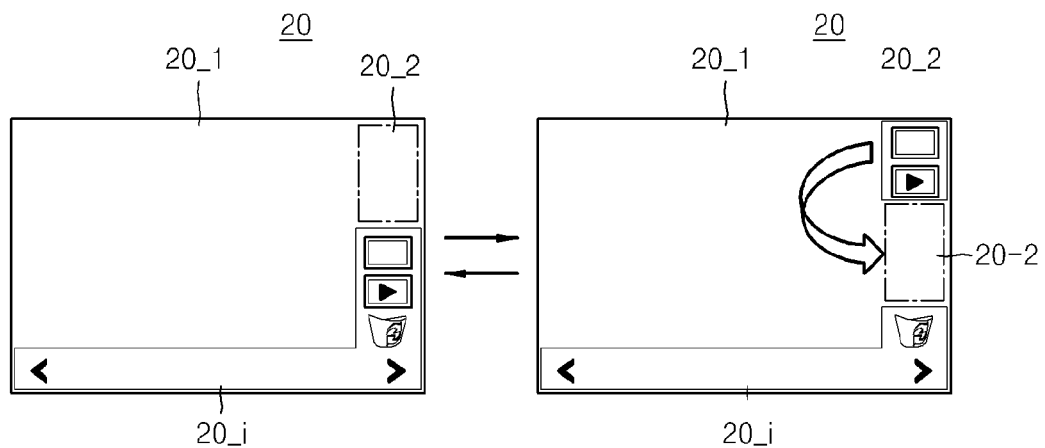

Referring to FIGS. 8 through 10, a size or a location of the icon 20_i is changed as a size or a location of the touch protection area 20_2 is changed.

Referring to FIG. 8, when the touch protection area 20_2 is expanded in a direction where the icon 20_i is located on the touch area 20_1, a size of the icon 20_i is reduced so that the changed touch protection area 20_2 and the icon 20_i do not overlap each other.

Referring to FIG. 9, as a size of the touch protection area 20_2 increases, a location of the icon 20_i is changed so that the icon 20_i does not overlap with the changed touch protection area 20_2.

Referring to FIG. 10, as a size of the touch protection area 20_2 is changed, arrangement of the icon 20_i may be changed. That is, as the touch protection area 20_2 is moved, the icon 20_i may be moved to the neighboring area where the touch protection area is not set and may be rearranged.

As such, changing of a location of the icon 20_i and reduction of a size of the icon 20_i may be adjusted by an algorithm or may be previously set by the user. That is, in FIGS. 8 through 10, even if the touch protection area 20_2 is adjusted, operations of the icon 20_i, which outputs execution signals for executing various operations of the digital camera (for example, skipping images in a playback mode, moving images to a trash can, executing or completing a playback mode, rotating, expanding, and reducing images in a playback mode), may not be affected.

Figure 11:
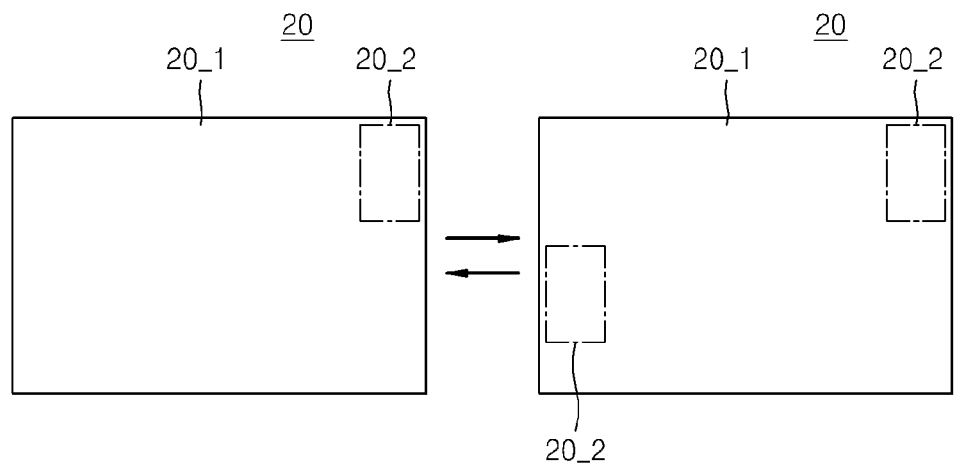

Referring to FIG. 11, a function of the menu for setting the touch protection area may be executed and then a plurality of touch protection areas 20_2 may be set. Second and third touch protection areas 20_2 may be set by copying an original touch protection area 20_2 or by setting a new touch protection area 20_2. However, a method of setting the second and third touch protection areas 20_2 is not limited thereto.

As illustrated in FIGS. 5 through 11, a size, location, and number of the touch protection area 20_2 are freely adjusted. Thus, even if the digital camera is gripped by the left hand or both hands, an appropriate size of the touch protection area may be set in various locations and thus a touch screen malfunction due to an undesired touch may be prevented. Also, since the icon 20_i is moved or the form of the icon 20_i is changed according to the touch protection area 20_2, the touch protection area and the icon may be used at the same time.

Figure 12:
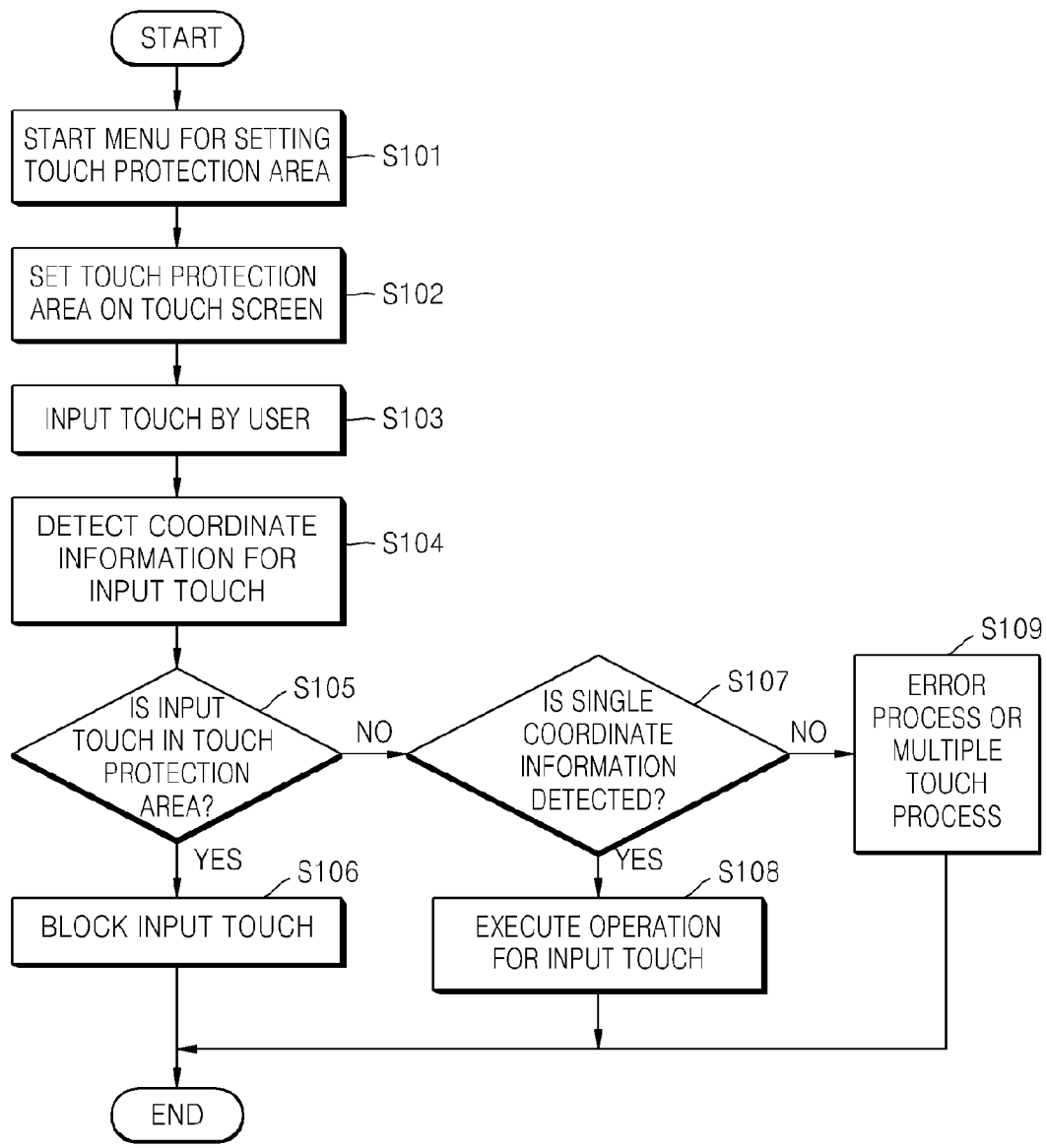
FIG. 12 is a flowchart illustrating a method of controlling a digital camera according to an embodiment.

FIG. 12 is a flowchart illustrating a method of controlling the digital camera according to an embodiment. The method illustrated in FIG. 12 may be described in relation to the elements of the digital camera; however, the method illustrated in FIG. 12 is only an example.

Referring to FIG. 12, the digital camera is turned on and a menu for setting a touch protection area 20_2 is started by using a button of the operating unit or by touching an icon displayed on the touch screen 20, in operation S101.

A user sets the touch protection area 20_2 in the touch area 20_1, in operation S102. A method of setting the touch protection area 20_2 is described above with reference to the description of the touch protection area setting unit 201 of FIG. 4 and changing of the touch protection area 20_2 is described above with reference to FIGS. 5 through 11.

When the touch screen 20 including the touch area 20_1 and set touch protection area 20_2 is touched by the user, in operation S103, the controller 200 detects coordinate information for the input touch, in operation S104. Whether the detected coordinate information is in the touch protection area 20_2 is identified, in operation S105.

If the coordinate information is in the touch protection area 20_2, the controller 200 blocks the input touch, in operation S106. That is, a control signal corresponding to the coordinates is prevented from being generated or a generated control signal is ignored. Accordingly, although the touch screen 20 is touched by being gripped by a user, if the touched part is in the touch protection area 20_2, an unnecessary function due to touch screen malfunction may not be executed.

If the coordinate information is in the touch area 20_1 instead of the touch protection area 20_2, the controller 200 identifies whether single coordinate information is detected, in operation S107. When the single coordinate information is detected, an operation corresponding to the input touch (coordinate information) is executed, in operation S108. When no single coordinate information is detected, error processing or multiple touch processing is performed, in operation S109.

Figure 13:
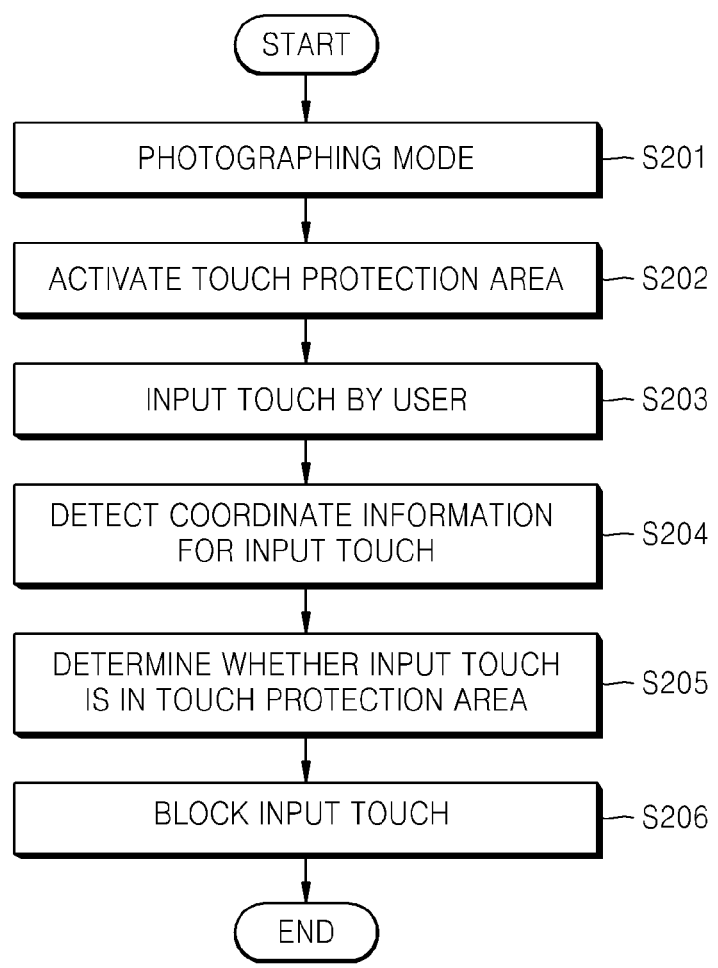
FIG. 13 is a flowchart illustrating a method of controlling a digital camera according to another embodiment.

FIG. 13 is a flowchart illustrating a method of controlling the digital camera according to another embodiment. The difference between FIG. 12 and FIG. 13 is that a process of activating the touch protection area 20_2 selected by a user in a photographing mode is further added in FIG. 13.

A user operates the digital camera in a photographing mode, in operation S201. In most cases, the user grips the digital camera by one hand for photographing in a photographing mode, whereas, in a playback mode, the user grips the digital camera by both hands. Accordingly, there is a strong probability that a touch error occurs due to the hand which grips the digital camera incorrectly touching a large-sized touch screen 20. However, the present embodiment is not limited to a photographing mode and the touch protection area 20_2 may be activated in other modes such as a playback mode.

The user activates the touch protection area 20_2 selected by a user, in operation S202. As illustrated in S101 and S102 of FIG. 12, the touch protection area may be previously set on the touch screen 20.

FIG. 14 is a view for explaining an example of the method of controlling the digital camera shown in FIG. 13. Operation S202 is described in more detail with reference to FIG. 14. As illustrated in FIG. 14($a$), a touch protection area 20_2 in an early stage of a photographing mode may not be displayed on the touch screen 20. That is, in a photographing mode, the user may select whether the touch protection area 20_2 is activated so as to be displayed on the touch screen 20 or whether the touch protection area 20_2 is inactivated so as to not be displayed on the touch screen 20.

For example, as illustrated in FIG. 14($b$), a mark indicating that the touch protection area 202 is hidden is indicated on a location where the touch protection area 20_2 is set so as to induce the user to activate the touch protection area 20_2. Also, a pop up window displaying the question "activate touch protection area?" may appear on the touch screen 20 of the digital camera.

The user may activate the hid touch protection area 20_2 as illustrated in FIG. 14($c$). In order to activate the touch protection area 20_2, an icon on the touch screen 20 may be clicked or a button of the operating unit may be pressed. In this case, in order for the user to recognize the touch protection area 20_2, the activated touch protection area 20_2 may be represented with a solid line on the frame thereof or the inside of the touch protection area 20_2 may be colored. However, embodiments are not limited thereto, and the activated touch protection area 20_2 in FIG. 14($c$) may be hidden as in FIG. 14($b$) and may be inactivated. In this case, the touch protection area 20_2 may be activated by clicking an icon on the touch screen 20 or by pressing a button of the operating unit 30.

When the touch protection area 202 is activated, the touch screen 20 is touched by the user in operation S203, coordinate information corresponding to the touch is detected in operation S204, and whether the detected coordinate information is in the touch protection area 20_2 is determined in operation S205. When the user touches the touch protection area 20_2, the input touch is blocked in operation S206. Also, when the user touches the touch area 20_1 instead of the touch protection area 20_2, whether the touch corresponds to single coordinate information or multiple coordinate information is identified. When the touch corresponds to single coordinate information, an operation corresponding to the touch is executed.

Finally, the user may activate or inactivate the touch protection area 20_2 and thus a digital camera, which is convenient and can facilitate a user's intentions, may be realized.

According to various embodiments, the touch protection area may be included in a large-sized touch screen and thus a touch malfunction may be prevented from occurring due to a user's grip of the digital camera.

In addition, the user may freely control the touch protection area and accordingly, icons on the touch screen may be automatically rearranged. Thus, the digital camera may be used conveniently.

Embodiments may include software modules which may be recorded and stored as program instructions or computer readable codes executable by a processor on non-transitory computer readable storage media such as read-only memory (ROM), random-access memory (RAM), CD-ROMs, magnetic tapes, floppy disks, and optical data storage devices. The computer readable storage medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will be recognized that the terms "comprising," "including," and "having," as used herein, are specifically intended to be read as open-ended terms of art. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital photographing apparatus comprising a display unit in the form of a touch screen, comprising: a touch area which receives a touch from a user and executes icons corresponding to the touch; and a touch protection area which is not activated by the touch when the touch by the user is sensed, wherein: the touch protection area is turned on by the user, the touch protection area selected by the user is activated on the touch screen in a photographing mode and the activated touch protection area is indicated on the touch screen for the user to recognize the activated touch protection area; and when the touch protection area is turned off, the touch protection area contains operable icons actuatable by touch.

2. The apparatus of claim 1, wherein the touch protection area is arbitrarily set on the touch screen and a plurality of points are input in the touch area so as to form the touch protection area comprising the points as vertexes.

3. The apparatus of claim 1, wherein a size or a location of the touch protection area is arbitrarily changed on the touch screen.

4. The apparatus of claim 3, wherein when the size or the location of the touch protection area is changed, a size or a location of the icons is adjusted so that the icons in an original touch area and the changed touch protection area do not overlap each other.

5. The apparatus of claim 1, wherein a plurality of touch protection areas are included on the touch screen.

6. A method of controlling a digital photographing apparatus, the method comprising: setting a touch protection area which is not activated by a touch when the touch is input on a touch screen, wherein: the touch protection area is turned on by the user; activating the set touch protection area selected by a user on the touch screen; inputting a touch on the touch screen, wherein the touch is performed by the user; detecting coordinate information for the input touch; determining whether the input touch is in the touch protection area by using the coordinate information; blocking when the input touch is determined to correspond to the touch protection area when the set touch protection area is activated; deactivating the set touch protection area; operating an actuable icon in response to a touch in the touch protection area when the set touch protection area is deactivated.

7. The method of claim 6, wherein the touch protection area is set by inputting a plurality of points on the touch screen and forming an area comprising the points as vertexes.

8. The method of claim 6, wherein in the setting of the touch protection area, a size or a location of the touch protection area is arbitrarily changed on the touch screen.

9. The method of claim 8, wherein when the size or the location of the touch protection area is changed, a size or a location of icons is adjusted so that the icons in an original touch area and the changed touch protection area do not overlap each other.

10. The method of claim 6, wherein in the setting of the touch protection area, a plurality of touch protection areas are included on the touch screen.

11. A digital photographing apparatus comprising: a touch protection area setting unit which sets a touch protection area on a touch screen which is not activated by a touch by a user when the touch is sensed, wherein: the touch protection area is turned on by the user; a touch protection area activation unit which activates and deactivates the set touch protection area selected by the user on the touch screen; a touch input unit which inputs a touch on the touch screen by the user; a coordinate detection unit which detects coordinate information for the input touch; a touch protection area determining unit which determines whether the input touch is in the touch protection area by using the coordinate information; a touch protection execution unit which blocks the input touch when the input touch corresponds to the touch protection area when the set touch protection area is activated; wherein the touch protection execution unit allows the input touch to activate an operable icon in the set touch protection area is deactivated.

12. The apparatus of claim 11, wherein the touch protection area setting unit sets the touch protection area by inputting a plurality of points on the touch screen and forming an area comprising the points as vertexes.

13. The apparatus of claim 11, wherein the touch protection area setting unit arbitrarily changes a size or a location of the touch protection area on the touch screen.

14. The apparatus of claim 13, wherein when the size or the location of the touch protection area is changed, a size or a location of icons is adjusted so that the icons in an original touch area and the changed touch protection area do not overlap each other.

15. The apparatus of claim 11, wherein the touch protection area setting unit sets a plurality of touch protection areas on the touch screen.

\* \* \* \* \*